United States Patent
Peng

(10) Patent No.: US 12,208,326 B2
(45) Date of Patent: Jan. 28, 2025

(54) VIRTUAL AUTOMATIC AIMING

(71) Applicant: Bungie, Inc., Bellevue, WA (US)

(72) Inventor: Gregory Peng, Bellevue, WA (US)

(73) Assignee: Bungie, Inc., Bellevue, WA (US)

( * ) Notice: Subject to any disclaimer, the term of this patent is extended or adjusted under 35 U.S.C. 154(b) by 0 days.

(21) Appl. No.: 18/281,281

(22) PCT Filed: Mar. 10, 2022

(86) PCT No.: PCT/US2022/019685
§ 371 (c)(1),
(2) Date: Sep. 8, 2023

(87) PCT Pub. No.: WO2022/192495
PCT Pub. Date: Sep. 15, 2022

(65) Prior Publication Data
US 2024/0149155 A1    May 9, 2024

Related U.S. Application Data

(60) Provisional application No. 63/158,961, filed on Mar. 10, 2021.

(51) Int. Cl.
*A63F 13/426* (2014.01)
*A63F 13/2145* (2014.01)
*A63F 13/79* (2014.01)

(52) U.S. Cl.
CPC ........ *A63F 13/426* (2014.09); *A63F 13/2145* (2014.09); *A63F 13/79* (2014.09)

(58) Field of Classification Search
CPC .......................... A63F 13/2145; A63F 13/426
See application file for complete search history.

(56) References Cited

U.S. PATENT DOCUMENTS

| 6,582,299 B1 * | 6/2003 | Matsuyama | ............ A63F 13/53 463/2 |
| 6,626,759 B1 | 9/2003 | Matsuoka | |

(Continued)

FOREIGN PATENT DOCUMENTS

| AU | 2022234397 | 10/2024 |
| CA | 3212973 | 9/2022 |

(Continued)

OTHER PUBLICATIONS

International Patent Application No. PCT/US2022/019685, International Search Report and Written Opinion mailed Jun. 21, 2022, 9 pages.

(Continued)

*Primary Examiner* — Chase E Leichliter
(74) *Attorney, Agent, or Firm* — Polsinelli LLP

(57) ABSTRACT

Described herein are techniques for implementing a virtualized physical controller. The techniques may comprise displaying, on a touchscreen display, an origin object and a set of potential target objects, receiving, from a user via the touchscreen display, a touch input associated with an action to be performed with respect to the origin object, determining, based on the action, a target object of the set of potential target objects on which the action is to be performed, changing a facing of the origin object to be directed toward the target object, and causing the action to be performed by the origin object on the target object.

19 Claims, 7 Drawing Sheets

(56) References Cited

U.S. PATENT DOCUMENTS

| | | | |
|---|---|---|---|
| 8,979,652 | B1 | 3/2015 | Ciszewski et al. |
| 9,004,997 | B1* | 4/2015 | Prosin .................. A63F 13/837 |
| | | | 463/2 |
| 9,238,175 | B2 | 1/2016 | Ciszewski et al. |
| 9,764,226 | B2* | 9/2017 | Prosin .................... A63F 13/00 |
| 10,388,053 | B1 | 8/2019 | Carter et al. |
| 10,994,205 | B2 | 5/2021 | Takafuji et al. |
| 11,511,191 | B2 | 11/2022 | Zhuang et al. |
| 11,596,866 | B1 | 3/2023 | McCain et al. |
| 11,794,107 | B2 | 10/2023 | Kutcher |
| 12,097,432 | B2 | 9/2024 | Timmins |
| 2003/0032478 | A1 | 2/2003 | Takahama et al. |
| 2007/0270215 | A1* | 11/2007 | Miyamoto .............. A63F 13/45 |
| | | | 463/32 |
| 2009/0181736 | A1* | 7/2009 | Haigh-Hutchinson ...................... |
| | | | A63F 13/55 |
| | | | 463/2 |
| 2010/0009733 | A1* | 1/2010 | Garvin ................... A63F 13/10 |
| | | | 463/37 |
| 2010/0009734 | A1* | 1/2010 | Sambongi ............. A63F 13/422 |
| | | | 463/5 |
| 2011/0165939 | A1 | 7/2011 | Borst et al. |
| 2012/0011464 | A1* | 1/2012 | Hayashi ............. H04N 1/00469 |
| | | | 715/784 |
| 2012/0322522 | A1 | 12/2012 | Ishikawa et al. |
| 2012/0322523 | A1* | 12/2012 | Woodard ................ A63F 13/69 |
| | | | 463/2 |
| 2013/0079140 | A1 | 3/2013 | Watkins et al. |
| 2013/0196767 | A1 | 8/2013 | Garvin et al. |
| 2014/0179430 | A1 | 6/2014 | Miyamoto et al. |
| 2015/0034722 | A1* | 2/2015 | Roman .................... F41G 1/467 |
| | | | 235/404 |
| 2015/0157940 | A1* | 6/2015 | Hall .................... A63F 13/5372 |
| | | | 463/31 |
| 2015/0258439 | A1* | 9/2015 | Prosin .................... A63F 13/00 |
| | | | 463/31 |
| 2015/0273333 | A1* | 10/2015 | Ciszewski ............... A63F 13/47 |
| | | | 463/31 |
| 2015/0356781 | A1 | 12/2015 | Miller |
| 2018/0264364 | A1 | 9/2018 | Zou |
| 2018/0292952 | A1 | 10/2018 | Norman et al. |
| 2019/0381403 | A1 | 12/2019 | Lin et al. |
| 2020/0038756 | A1 | 2/2020 | Takafuji et al. |
| 2020/0094135 | A1 | 4/2020 | Miao |
| 2020/0122025 | A1 | 4/2020 | Tsuchiya et al. |
| 2020/0376383 | A1* | 12/2020 | Guimaraes .............. G06T 13/40 |
| 2022/0137800 | A1 | 5/2022 | Long et al. |
| 2022/0193550 | A1 | 6/2022 | Wang et al. |
| 2022/0203237 | A1 | 6/2022 | Kutcher |
| 2022/0266144 | A1 | 8/2022 | Zhuang et al. |
| 2023/0099016 | A1 | 3/2023 | McCain et al. |
| 2023/0241496 | A1 | 8/2023 | Vaught et al. |
| 2023/0249076 | A1 | 8/2023 | Lin et al. |
| 2023/0277941 | A1 | 9/2023 | Fukada et al. |
| 2024/0042322 | A1 | 2/2024 | Timmins |

FOREIGN PATENT DOCUMENTS

| | | |
|---|---|---|
| CA | 3212975 | 9/2022 |
| CN | 110975289 | 4/2020 |
| CN | 111068324 | 4/2020 |
| CN | 111714891 A | 9/2020 |
| CN | 111773724 A | 10/2020 |
| CN | 112306351 | 2/2021 |
| CN | 116963810 | 10/2023 |
| CN | 116964551 | 10/2023 |
| EP | 4284527 A | 12/2023 |
| EP | 4288861 A | 12/2023 |
| IL | 305744 A | 11/2023 |
| IL | 305745 A | 11/2023 |
| IL | 305744 B | 10/2024 |
| JP | 2020039947 A | 3/2020 |
| JP | 2024-509788 | 3/2024 |
| JP | 2024-512246 | 3/2024 |
| JP | 7532679 | 8/2024 |
| JP | 7532682 | 8/2024 |
| KR | 10-2013-0027621 A | 3/2013 |
| KR | 20130027621 A | 3/2013 |
| KR | 20150095999 A | 8/2015 |
| KR | 20150116299 A | 10/2015 |
| KR | 10-2017-0001539 A | 1/2017 |
| KR | 20170001539 A | 1/2017 |
| KR | 10-2018-0119002 | 11/2018 |
| MX | MX/a/2023/010554 | 9/2023 |
| MX | MX/a/2023/010555 | 9/2023 |
| WO | WO 2022/192493 | 9/2022 |
| WO | WO 2022/192495 | 9/2022 |

OTHER PUBLICATIONS

PCT Application No. PCT/US2022/019682, International Search Report and Written Opinion mailed Jun. 10, 2022, 8 pages.

PCT Application No. PCT/US2022/019682, International Preliminary Report on Patentability mailed Sep. 12, 2023, 4 pages.

PCT Application No. PCT/US2022/019685, International Preliminary Report on Patentability mailed Sep. 12, 2023, 4 pages.

New Zealand Application No. 803265, Examination Report dated Sep. 20, 2023.

Japanese Application No. 2023-551983, Office Action dated Feb. 20, 2024.

Japanese Application No. 2023-550046, Office Action dated Feb. 20, 2024.

Canadian Application No. 3212973, Examiner's Report dated Oct. 4, 2023.

Canadian Application No. 3212975, Examiner's Report dated Dec. 27, 2023.

Australian Application No. 2022232621, Examination Report No. 1 dated Oct. 24, 2023.

Australian Application No. 2022234397, Examination Report No. 1 dated Oct. 13, 2023.

PCT/US2022/019685, Gregory Peng, Virtual Automatic Aiming, Mar. 10, 2022.

P6002246/2023, Gregory Peng, Virtual Automatic Aiming, Sep. 7, 2023.

2022234397, Gregory Peng, Virtual Automatic Aiming, Sep. 7, 2023.

3212975, Gregory Peng, Virtual Automatic Aiming, Sep. 8, 2023.

202280020327.8, Gregory Peng, Virtual Automatic Aiming, Sep. 8, 2023.

22767961.0, Gregory Peng, Virtual Automatic Aiming, Sep. 6, 2023.

305744, Gregory Peng, Virtual Automatic Aiming, Sep. 7, 2023.

2023-550046, Gregory Peng, Virtual Automatic Aiming, Aug. 18, 2023.

MX/a/2023/010555, Gregory Peng, Virtual Automatic Aiming, Sep. 7, 2023.

803479, Gregory Peng, Virtual Automatic Aiming, Sep. 7, 2023.

2023124999, Gregory Peng, Virtual Automatic Aiming, Sep. 29, 2023.

523450615, Gregory Peng, Virtual Automatic Aiming, Sep. 10, 2023.

PCT/US2022/019682, Luke Timmins, Markup Free Ledge Grab, Mar. 10, 2022.

P6002251/2023, Luke Timmins, Markup Free Ledge Grab, Sep. 7, 2023.

2022232621, Luke Timmins, Markup Free Ledge Grab, Aug. 31, 2023.

3212973, Luke Timmins, Markup Free Ledge Grab, Sep. 8, 2023.

202280020245.3, Luke Timmins, Markup Free Ledge Grab, Sep. 8, 2023.

22767959.4, Luke Timmins, Markup Free Ledge Grab, Sep. 1, 2023.

305745, Luke Timmins, Markup Free Ledge Grab, Sep. 7, 2023.

2023-551983, Luke Timmins, Markup Free Ledge Grab, Aug. 25, 2023.

(56) References Cited

OTHER PUBLICATIONS

MX/a/2023/010554, Luke Timmins, Markup Free Ledge Grab, Sep. 7, 2023.
803265, Luke Timmins, Markup Free Ledge Grab, Aug. 31, 2023.
2023124998, Luke Timmins, Markup Free Ledge Grab, Sep. 29, 2023.
523450619, Luke Timmins, Markup Free Ledge Grab, Sep. 10, 2023.
Canadian Application No. 3212973, Examiner's Report dated Apr. 29, 2024.
Israeli Application No. 305745, Office Action dated Mar. 5, 2024.
U.S. Appl. No. 18/281,281, Non-Final Office Action dated May 9, 2024.
Australian Application No. 2022232621, Examination Report No. 2 dated May 20, 2024.
Australian Application No. 2022234397, Examination Report No. 2 dated May 15, 2024.
Canadian Application No. 3212975, Examiner's Report dated Jun. 5, 2024.
Chinese Application No. 202280020245.3, First Office Action dated Mar. 8, 2024.
Mexican Application No. MX/a/2023/010554, Office Action dated Apr. 9, 2024.
Mexican Application No. MX/a/2023/010555, Office Action dated Apr. 9, 2024.
U.S. Appl. No. 18/281,280, Non-Final Office Action dated Dec. 22, 2023.
Australian Application No. 2022232621, Examination Report No. 3 dated Aug. 19, 2024.
Australian Application No. 2022234397, Examination Report No. 3 dated Aug. 8, 2024.
European Application No. 22767959.4, Extended European Search Report dated Aug. 29, 2024.
European Application No. 22767961.0, Extended European Search Report dated Jul. 31, 2024.
Chinese Application No. 202280020245.3, Second Office Action dated Oct. 26, 2024.

* cited by examiner

VIRTUAL AUTOMATIC AIMING

BACKGROUND

Modern computer controller systems, such as those used by computer and video games, as well as by general-use operating systems, employ a variety of techniques to direct the movement of objects displayed on-screen. Known techniques include the use of an external control device such as a mouse, directional nub, touchpad, pen, game controller, or joystick to create either a directional vector or to designate a position for moving an onscreen object, such as a pointer or reticle, or to cause movement of a user's viewpoint.

Some techniques can employ an additional layer of sophistication by measuring the speed of movement of the external device to enhance movement of the on-screen object by changing the behavior of the on-screen object in response to a parameter of the input (e.g., acceleration of a pointer based on the speed at which an external device is moved). Touch enabled devices can also be configured to accept inputs in ways that simulate the behavior of external control devices. Existing control schemes, both physical and virtual, often fail to be as responsive to player input as desired and causing particular issues for games being played on a touch device with a flat screen, i.e., "virtual controllers." For games with isometric ("top down") cameras, it's common to have a virtual controller control both an avatar's facing and the speed at which they move, but when compared to a mouse and keyboard or a physical controller with two analog thumb sticks, there is less precision and input granularity with a virtual controller. This leads to player frustration that they can't easily control their avatar to match their desires, coupled with frustration when a game "helps" the player to a noticeable degree. Therefore, improvements in player assist techniques that are not intrusive are of great interest.

SUMMARY

Techniques are provided herein for implementing a virtual controller in which automatic (e.g., independent of received human instructions) targeting of objects may be enabled. The techniques may be used to adjust or otherwise refine a facing of an origin object being controlled by a user of the virtual controller. In some embodiments, the facing of the origin object is adjusted to be directed toward an object to be targeted.

A virtual controller, as opposed to a physical controller, may be any suitable electronic device on which at least some of the control input mechanisms are instantiated virtually. For example, a virtual controller may include a touchscreen display that is configured to present a button or other input mechanism. A user's touch on the touchscreen display may be detected during the use of the virtual controller. If a location of the detected user's touch corresponds to a location of the presented button, then the button may be activated.

In one embodiment, a method is disclosed as being performed by a user device, the method comprising displaying, on a touchscreen display, an origin object and a set of potential target objects, receiving, from a user via the touchscreen display, a touch input associated with an action to be performed with respect to the origin object, determining, based on the action, a target object of the set of potential target objects on which the action is to be performed, changing a facing of the origin object to be directed toward the target object, and causing the action to be performed by the origin object on the target object.

An embodiment is directed to a computing system comprising a touchscreen display, a processor; and a memory including instructions that, when executed with the processor, cause the computing device to, at least display, on the touchscreen display, an origin object and a set of potential target objects, receive, from a user via the touchscreen display, a touch input associated with an action to be performed with respect to the origin object, determine, based on the action, a target object of the set of potential target objects on which the action is to be performed, change a facing of the origin object to be directed toward the target object, and cause the action to be performed by the origin object on the target object.

An embodiment is directed to a non-transitory computer-readable media collectively storing computer-executable instructions that upon execution cause one or more computing devices to collectively perform acts comprising displaying, on a touchscreen display, an origin object and a set of potential target objects, receiving, from a user via the touchscreen display, a touch input associated with an action to be performed with respect to the origin object, determining, based on the action, a target object of the set of potential target objects on which the action is to be performed, changing a facing of the origin object to be directed toward the target object, and causing the action to be performed by the origin object on the target object.

The foregoing, together with other features and embodiments will become more apparent upon referring to the following specification, claims, and accompanying drawings. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different FIGS. indicates similar or identical items or features.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to techniques for providing improved object targeting for use with a virtual controller. In some embodiments, such techniques may first involve identifying a number of potential target objects, which may include objects upon which an action associated with an origin object may be performed. In some embodiments, the number of potential target objects may be identified by virtue of those objects being located within one or more areas identified as being associated with the action to be performed. Once the number of potential target objects has been identified, the techniques may involve determining a target object from the set of potential target objects and repositioning the origin object so that its facing is directed toward that target object.

Embodiments of the disclosure provide for a number of advantages over conventional systems. In systems that include a physical controller, physical directional control pads can provide movement control with a high degree of accuracy. However, in systems that include a virtual controller that has a touchscreen display, movement control may be provided via a directional pad displayed on the touchscreen display. In such systems, movement control may suffer from low accuracy as user swipes may be hard to detect or may fail to provide accurate direction. Accordingly, users may find it difficult to achieve a desired facing for a character that he or she is controlling using a virtual controller.

The embodiments described herein make it easier (with no additional input aside from the initial button press) for the player to "interact" with targets by automatically changing the position and facing of a player's avatar in a way that feels natural and unobtrusive to the player. These methods allow us to change target acquisition parameters based on the player's avatar, the type of interaction (ex. attack vs pick up) and different abilities (ex. punch vs heavy punch).

Figure 1:
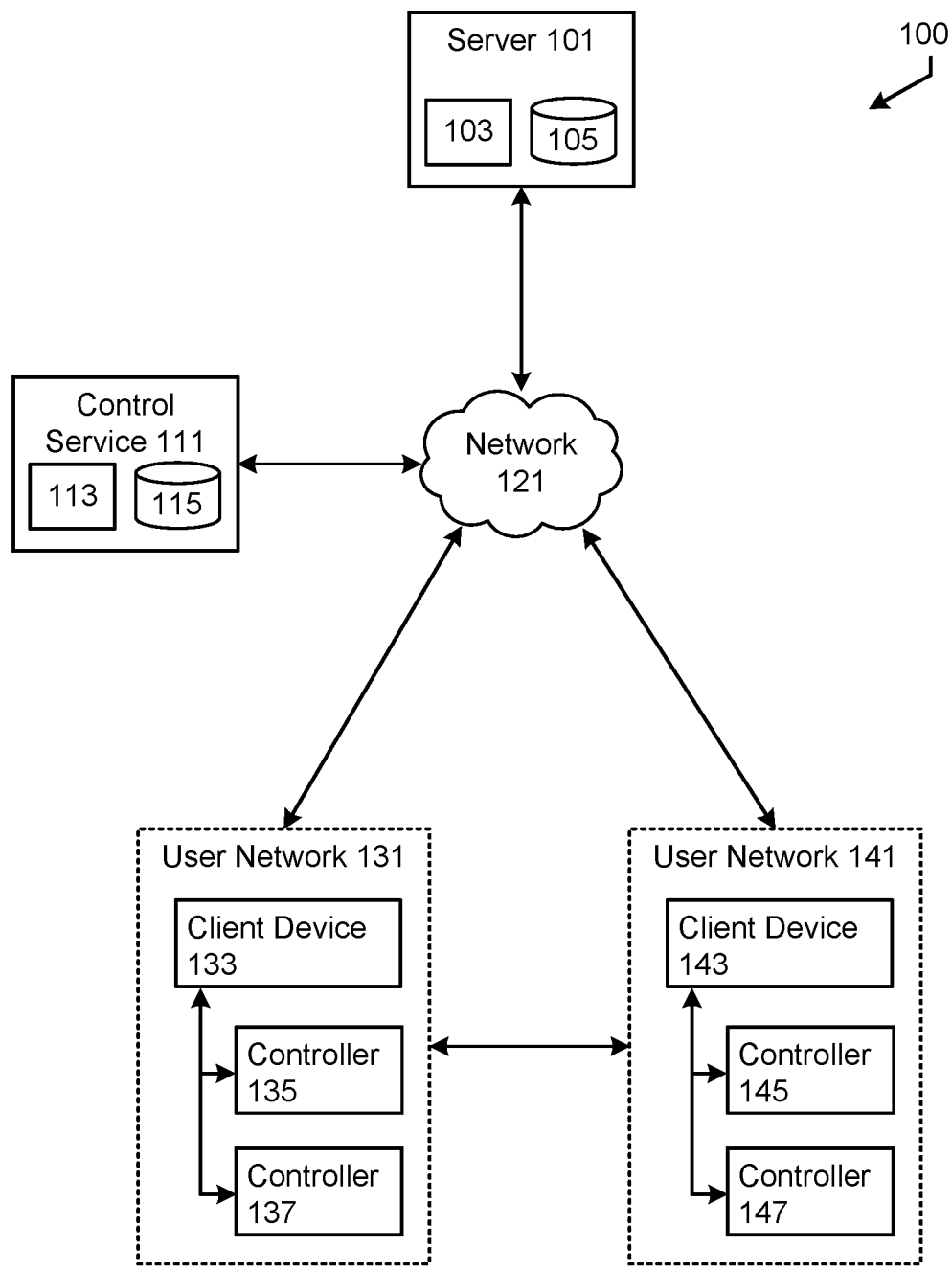
FIG. 1 is a simplified system diagram illustrating a service environment in which a virtual controller can be used, in accordance with various embodiments of the present disclosure.

FIG. 1 is a simplified system diagram illustrating a service environment 100 in which a virtual controller can be used, in accordance with various embodiments of the present disclosure. The service environment 100 includes at least one server 101, which includes at least one processor 103 and non-transitory memory 105 storing as software instructions to facilitate operation of the service environment. The server 101 is connected via a network 121 (e.g., the Internet or a local network), with any suitable number of user-owned client devices 133, 143, which typically operate in conjunction with respective local user networks 131, 141 (e.g., consumer or commercial local area networks, WIFI networks, etc.)

The server 101 can also connect to any suitable number of control services 111, e.g., network-connected computing systems with their own processors 113 and memory 115 that monitor network to and from the server 101 and client devices 133, 143. In some embodiments, the server 101 can be one or more servers operating at commercial scale, e.g., a datacenter or server farm. Client devices 133, 143 can include, but are not limited to, consumer personal computers, video game consoles, thin-client devices operable to stream video content from the server 101 for presentation on a local screen, or mobile devices such as smartphones, tablets, or the like. Client devices 133, 143 can connect to any suitable number of controllers, e.g., controller 135, 137, 145, 147.

Each controller (e.g., controller 135) can be hardware devices (e.g., console-specific controllers, cross-compatible controllers, or virtual controllers) with connectivity hardware and protocols for communicating with their respective client device 133. According to some embodiments, controller 135 can be a virtualized controller operating on a thin-client device or touchscreen device, e.g., a controller simulated on a touchscreen smartphone, tablet, or console-like controller with a touch-enabled panel. According to some further embodiments, e.g., where the client device 133 is a thin-client device or mobile device, controller 135 can be a touchscreen with virtualized controls that is built-in to the client device. Alternatively, even where the client device 133 is a thin-client device, controller 135 can be a hardware controller configured to physically or wirelessly connect with the client device. According to some embodiments, the client device 133 and server 101 can operate on the same hardware, e.g., the client device running as a virtual instance on the server.

The methods described herein can be implemented on client devices in conjunction with a service environment such as service environment 100 described in FIG. 1. The methods can further work in the context of arbitrary placement of the virtual controller, which controls both avatar facing and movement, on-screen.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
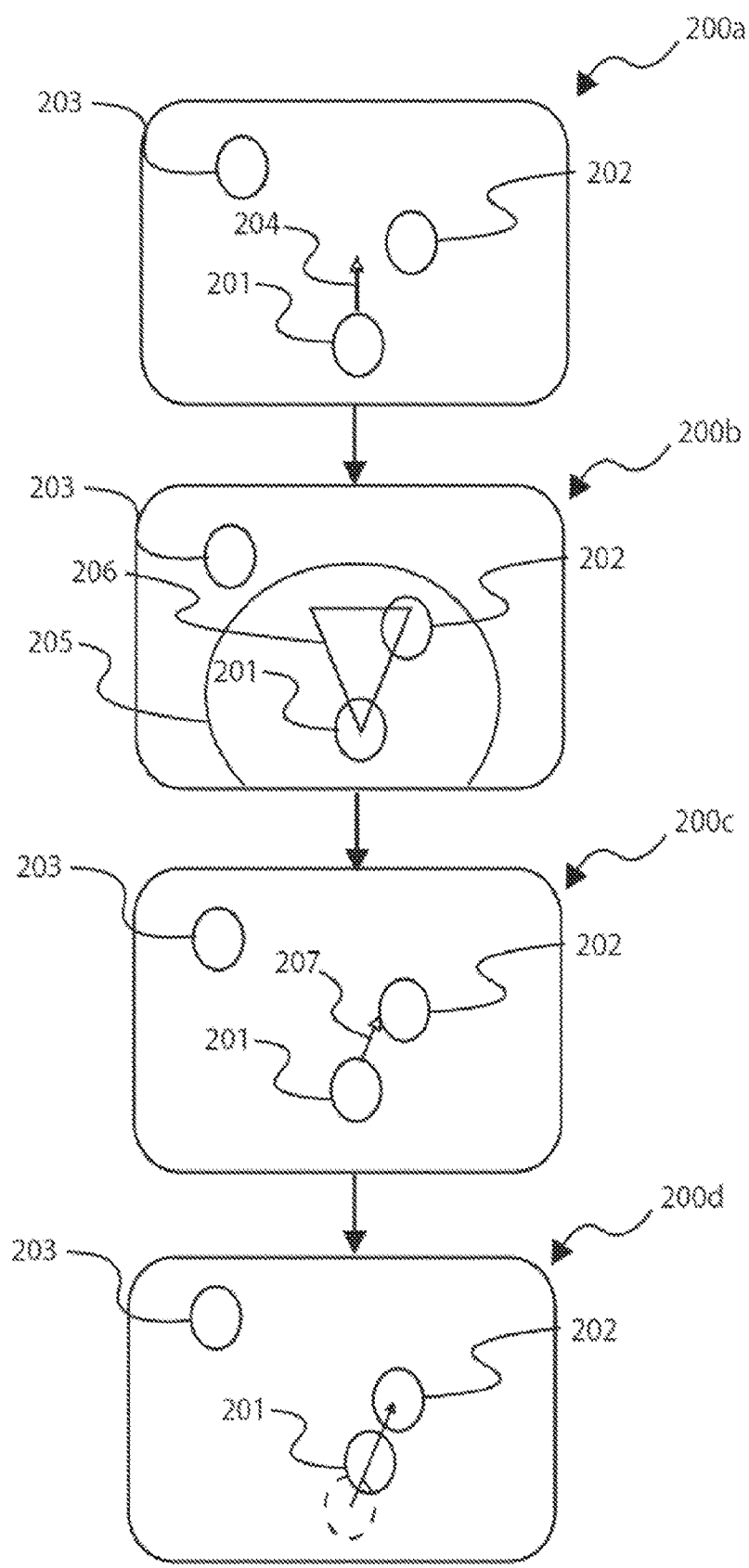
FIG. 2 depicts an illustrative example of an environment that includes a virtual controller in which automatic object targeting may be implemented in accordance with embodiments.

FIG. 2 depicts an illustrative example of an environment 200 that includes a virtual controller in which automatic object targeting may be implemented in accordance with embodiments. First, as shown in 200a, the game determines it wants to identify a "target" for the player—usually because the player pressed a button (ex. "punch"), but not always (we may want to highlight items the player could possibly interact with and run this logic). Tracked information includes location information about the player's avatar 201, a near target 202 and a far target 203, which may be opponent avatars or interactable items, and a facing direction 204 or movement direction of the player's avatar.

As shown at 200b, from the avatar's position 201 we do a spherical collision check 205 at a specified radius to look for possible targets, e.g. near target 202. Far target 203 is excluded for being outside the specified radius. For each target within range, we look at the angle delta between the player's input vector (if they are providing input on the virtual joystick, otherwise we just use the avatar facing) and the angle of a vector constructed form the avatar's position to the target's position. This is basically a conical test 206 from the avatar 201 for a specified angle with respect to the facing direction 204. It's possible the target's displayed position is outside the cone, but the target's "pill" (a 3*d* shape representing the size of the entire target object) is inside the cone. As a fallback, we can take the target's pill and test two "line segments" from the player's avatar to the farthest left and farthest right our targeting angle allows and see if a line segment 207 intersects the target 202, (or approximation of the target, or "pill,") as shown in 200*c*. If it does, we consider it a valid target. Lastly, we sort the found targets by their proximity to the player's avatar. As shown in 200*d*, when a valid target 202 has been identified, and responsive to the player's input, the game system can cause the player's avatar to execute the indicated action on the identified target.

What's powerful about this method is it can be run multiple times with different parameters for a given player input. For example, a designer may run the method once with a small radius and large angle, and a second time with a larger radius and smaller angle. If a target is found on the first invocation, the designer may turn the player's avatar faster toward the target to line up for a direct hit, but if it's found on the second query they may only turn the player's avatar a small amount but accelerate their movement towards the more distant target.

Figure 3:
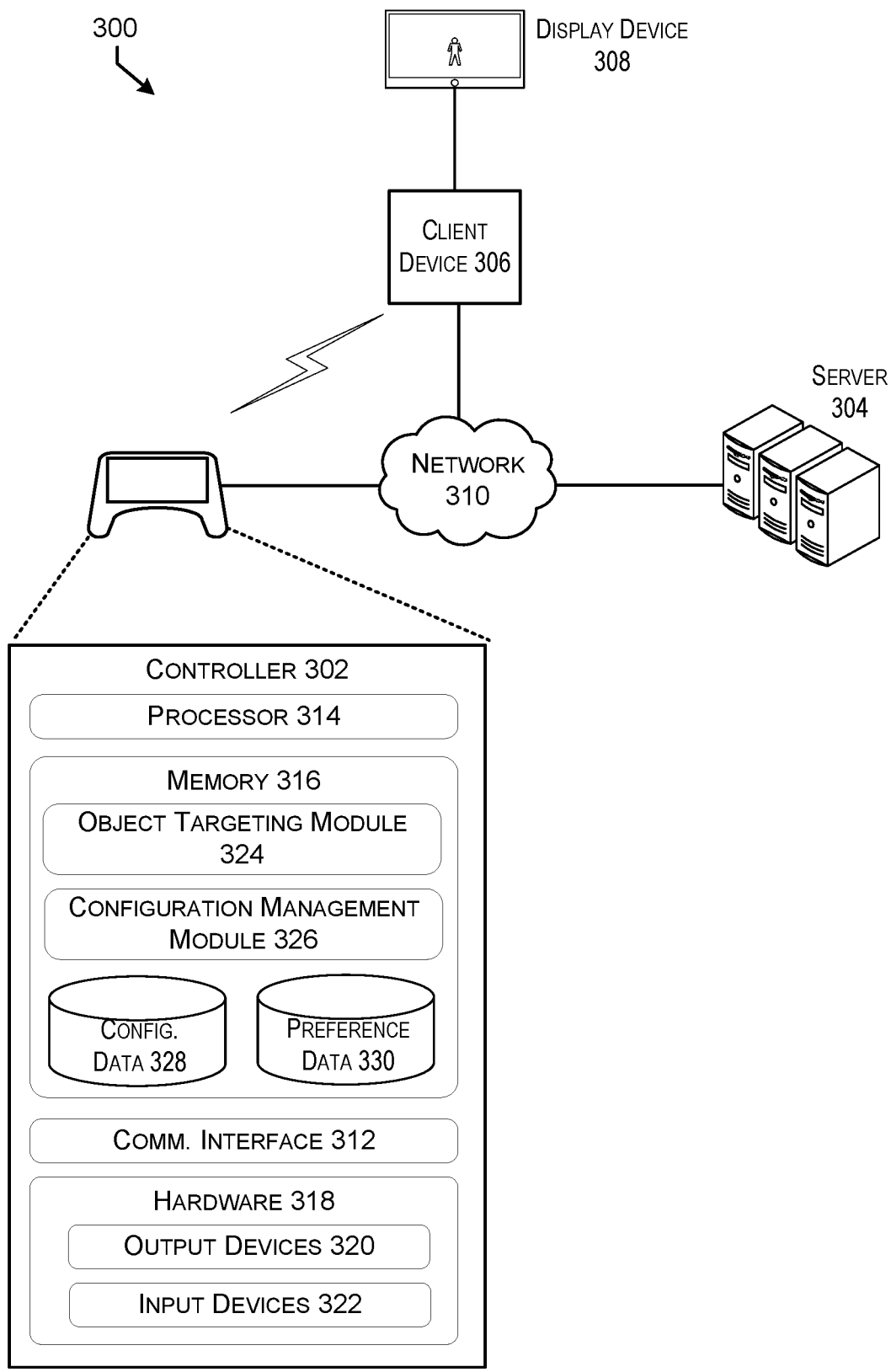
FIG. 3 is a block diagram showing various components of a computing system architecture that supports implementation of a virtualized physical controller in accordance with embodiments.

FIG. 3 is a block diagram showing various components of a computing system architecture that supports implementation of a virtualized physical controller in accordance with embodiments. The system architecture may include at least one controller 302. In some embodiments, the controller 302 may be in communication with one or more server 304, which may be an example of the server 101 as described with respect to FIG. 1. In some embodiments, the one or more server 101 may provide backend support for the controller 302. For example, at least a portion of the processing described as being performed by the controller 302 may instead be performed by the server 101 in some cases. In some embodiments, the controller 302 may be in communication with a client device 306. The client device 306 may be an example of client device 133 or 143 as described in relation to FIG. 1 above. In some embodiments, the client device 306 may be in further communication with a display device 308. Each of the components described herein may be in communication via a connection over a network 310.

The controller 302 may include any suitable computing device configured to perform at least a portion of the operations described herein and configured to enable a user to interact with a software application. In some embodiments, the controller may be a mobile device (e.g., a smartphone or tablet) having touchscreen capabilities. The controller 302 may include a communication interface 312, one or more processors 314, memory 316, and hardware 318. The communication interface 312 may include wireless and/or wired communication components that enable the controller 302 to transmit data to and receive data from other networked devices. The hardware 318 may include additional user interface, data communication, or data storage hardware. For example, the user interfaces may include at least one output device 320 (e.g., visual display, audio speakers, and/or haptic feedback device), and one or more data input devices 322. The data input devices 322 may include, but are not limited to, combinations of one or more of keypads, keyboards, mouse devices, touchscreens that accept gestures, microphones, voice or speech recognition devices, and any other suitable devices.

The memory 316 may be implemented using computer-readable media, such as computer storage media. Computer-readable media includes, at least, two types of computer-readable media, namely computer storage media and communications media. Computer storage media includes any suitable volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 314 and the memory 316 of the controller may implement functionality that includes one or more software modules and data stores. Such software modules may include routines, program instructions, objects, and/or data structures that are executed by the processors 314 to perform particular tasks or implement particular data types. More particularly, the memory 316 may include a module that is configured to perform object targeting for the virtual controller (e.g., object targeting module 324) as well as a module that is configured to maintain and implement configuration information for input mechanisms of a virtualized controller (e.g., configuration management module 326).

Additionally, the memory 316 may include various data stores. For example, the memory 316 may maintain data about virtualized controller configurations based on context (e.g., configuration data 328). In some embodiments, such configuration data may include an indication of one or more aspects of the input mechanisms that should be implemented based on state. For example, the configuration data may include an indication of a size, location, shape, appearance (e.g., color, shading, and/or text) of each input mechanism as related to individual states. In some cases, the configuration data may indicate which input mechanisms should or should not be presented during a particular state.

In some embodiments, the memory 316 may further maintain data about user preferences (e.g., preference data 330) that stores information about object targeting preferences for one or more users of the controller. In some embodiments, the user preferences may be indicated by a user. For example, a user may provide (e.g., during a setup or configuration phase) information about target objects to be selected for automatic targeting under specified conditions. In some embodiments, the user preference data may include information about historic object targeting patterns exhibited by the user. For example, the data may indicate that, given a combination of target objects presented to the user, which of those objects are typically selected by that user. In this example, the preference data may include ranking data generated based on historic usage data.

The object targeting module 324 may be configured to, in conjunction with the processor 314, identify one or more objects on which an action is to be performed. In some embodiments, the one or more objects are selected from a set of potential target objects generated by identifying objects within one or more areas (e.g., conical regions). In some embodiments, the object targeting module 324 may be configured to select an object from the generated set of potential target objects based on information about a priority assigned to each of those objects. In some embodiments, an object may be selected based on information about objects that have been historically targeted by a user. In some embodiments, an object may be selected from a set of objects based on a distance between the respective object and an object (e.g., a character) being controlled by the user.

The configuration management module 326 may be configured to, in conjunction with the processor 314, generate and manage configuration information in relation to an arrangement of one or more input mechanisms within a user interface presented on the controller 302. In some embodiments, the configuration management module facilitates customization of input mechanism layout in accordance with some embodiments. It should be noted that such customization is described in related Patent Cooperation Treaty (PCT) Application Number US2022/019240, entitled "Virtualized Physical Controller," by Gregory Peng, which is herein incorporated by reference in its entirety.

The server 304 can include any computing device configured to perform at least a portion of the operations attributed to it. The server 304 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 304 can include one or more virtual machines running virtual operating systems, or other computing architectures involving virtualization such as one or more flexible pools of logical storage devices that can be virtualized to maintain virtual storage devices for the computer. For example, the server 304 may include virtual computing devices in the form of virtual machines or software containers that are hosted in a cloud.

The client device 306 may include any suitable computing device configured to receive input from the controller 302 and perform an action based on that input. In some embodiments, the client device may be a gaming system, such as a gaming console that may receive input from a number of controllers, each of which may be used to control an avatar or character within a software application (e.g., a computer game).

Figure 4:
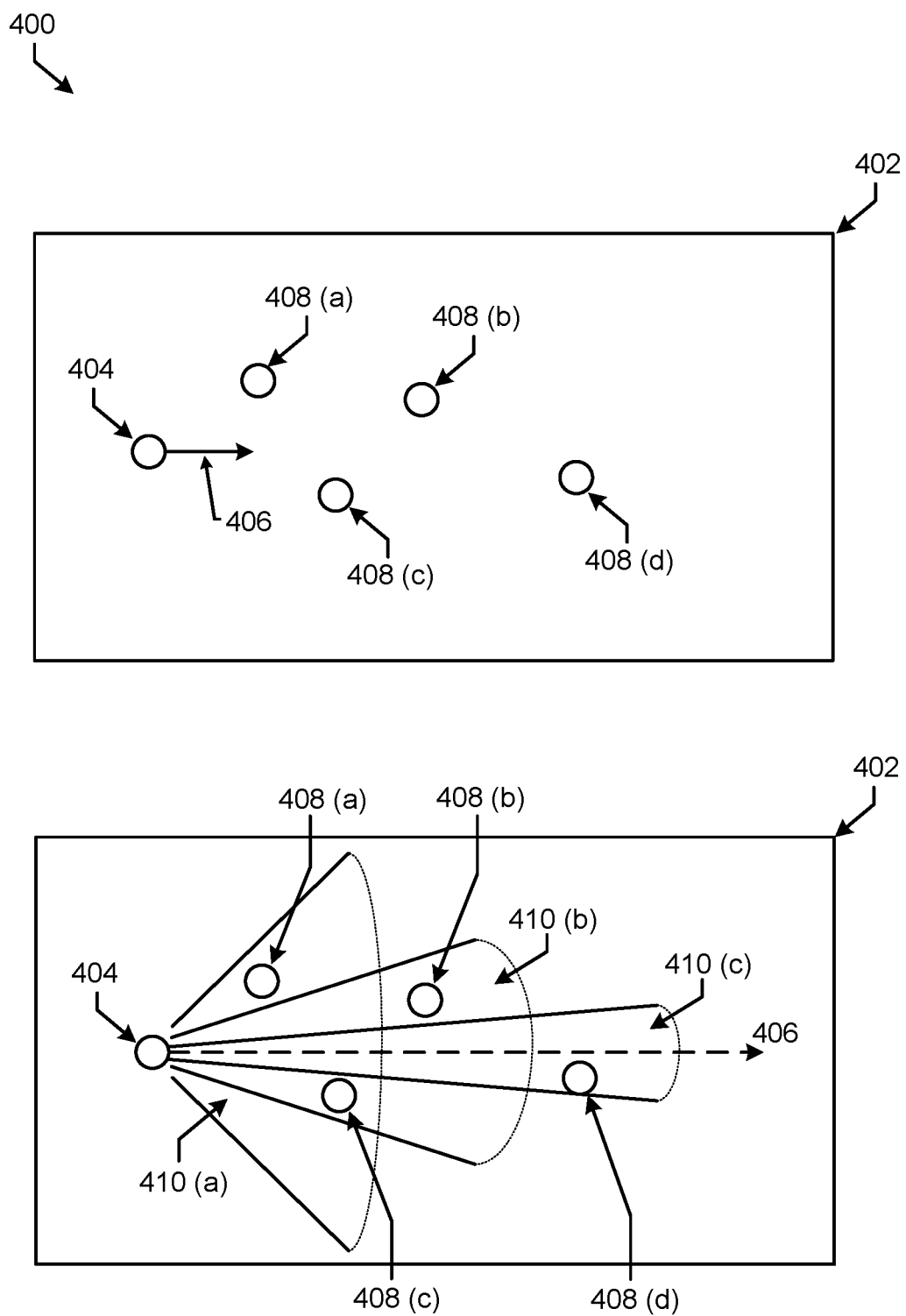
FIG. 4 depicts a graphical illustrating of a process for performing object targeting in accordance with embodiments.

FIG. 4 depicts a graphical illustrating of a process for performing object targeting in accordance with embodiments. The process 400 may be performed on a user device upon which a virtual physical controller is implemented, such as the controller 302 as described with respect to FIG. 3 above. In embodiments, the process may be performed with respect to one or more objects instantiated by a software application. Such objects may be depicted on a display via a graphical user interface (GUI) 402.

In some embodiments, the process for selecting objects to be targeted may be performed in relation to an origin object 404. In some embodiments, the origin object may be an object that is controlled by the user via the controller, such as an avatar character. The origin object may have a current position within a space depicted on the display as well as a current facing 406 that represents a direction in which a front of the origin object is pointed. In addition to the origin object 404, a number of potential target objects 408 (a-d) may also be positioned within the space depicted on the display.

As previously noted, the process for selecting objects to be targeted may involve identifying one or more of the potential target objects 408 to be targeted by an action performed in relation to the origin object. To do this, positions for each of the objects 408 may be determined in relation to the origin object and its facing. In the process for selecting objects to be targeted, a number of areas or regions 410(a-c) are created in relation to the origin object. In some embodiments, the number of areas may be cones. Such cones may at least partially overlap. In some cases, each area in the number of areas may be assigned a priority or weight value. In some embodiments, a length of each area of the number of areas may correspond to a range associated with an action of a number of actions capable of being performed by the origin object.

In the process, a determination may be made as to which areas 410 each of the respective objects 408 are located within. A set of objects may be generated to include an indication of each object identified as being located within one or more of the areas. In some cases, each object may be further assigned a priority or weight based on an area in which the respective object is determined to be located. Once a set of objects has been generated, an object may be selected from that set of objects to be the target of an action to be performed. In some embodiments, the generated set of objects may be restricted or limited. For example, one or more objects may be removed from the generated set of objects based on information about those objects. In this example, a range may be associated with an action to be performed by the origin object, the range representing a maximum distance at which the action may be performed. Continuing this example, objects for which the distance between that object and the origin object are greater than a threshold distance are removed from the generated set of objects.

An object to be the target of an action may be selected from the generated set of objects based on any number of suitable factors. In some embodiments, the object may be selected based on a priority assigned to each of the objects in the set of objects. In some embodiments, the object may be selected based on an area in which the object is determined to be located. In some embodiments, the object may be selected based on user preferences. For example, in cases in which two or more objects are identified as being potential target objects, a selection may be made between the two or more objects based on historic object targeting patterns for a user. In this example, historic usage data may be identified with respect to a user to determine, when presented with a number of potential target objects, which potential target object is typically preferred by a user when performing an action. Such preferences may include information about a distance between an object selected by a user on which an action is to be performed and the origin object, an angle between the selected object and a facing of the origin object, a type of the selected object, or any other suitable factor.

Figure 5:
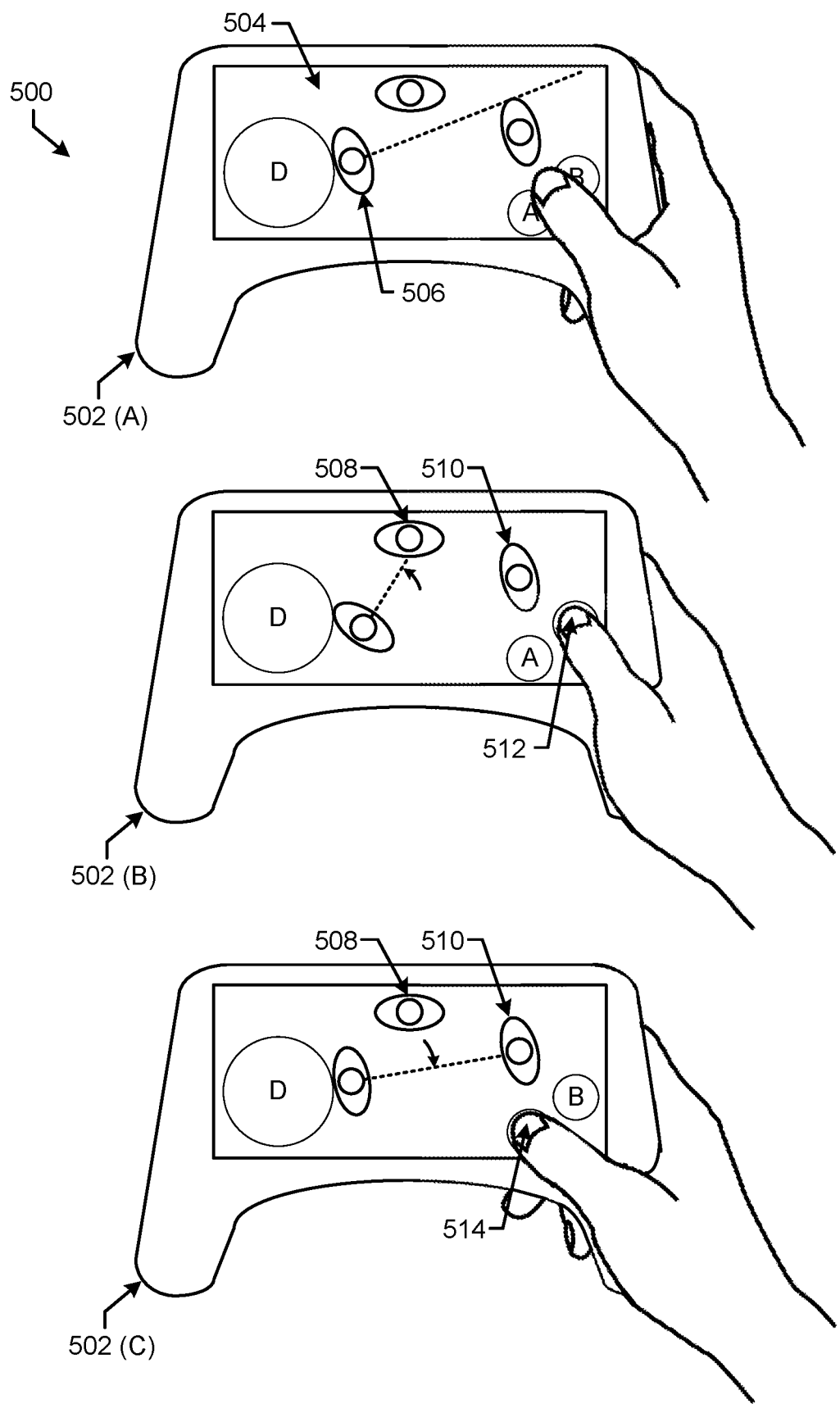
FIG. 5 depicts a graphical illustration of a process for executing a charge operation on a virtual controller in accordance with embodiments.

FIG. 5 depicts a graphical illustration of a process for executing a charge operation on a virtual controller in accordance with embodiments. The process 500 is depicted on a series of images of a user device 502 (A-C) on which a virtual controller may be implemented. As depicted, the virtual controller may be implemented via a graphical user interface (GUI) 504 that is presented on a touchscreen display.

As depicted, an origin object 506 is displayed as being positioned within the GUI at an associated position and facing. Additionally, a number of potential target objects 508 and 510 may also be displayed as being positioned within the GUI. In these cases, a facing of the origin object 506 may not be aligned with any of the number of potential target objects during an initial state.

A user may initiate an action to be performed by the origin object by pressing a button (e.g., button 512 or 514). In some embodiments, each of the buttons 512 and 514 may be associated with a different action to be performed. In some cases, each of the different actions may be associated with a different corresponding range. In these cases, valid target objects for each of the actions that may be performed are at least partially dependent upon the respective range for those actions.

Upon selection of a button by a user, an action may be initiated and an object selection process may be performed based on that action to select a target object. Once a target object has been selected, an automatic targeting process may be performed by repositioning (e.g., rotating) the origin object such that a facing of the origin object is aimed at the selected target object.

In a first example, the user may select a button 512 that initiates a first action. In this example, a range associated with the first action may be relatively short such that of a set of potential target objects 508 and 510, object 508 may be in range and object 510 may be out of range, resulting in object 508 being the only valid potential target. In such a case, object 508 is selected as a target of the first action. The origin object is rotated toward the object 508 and the first action is performed.

In a second example, the user may select a button 514 that initiates a second action. In this example, a range associated with the second action may long enough such that each of objects 508 and 510 may be in range, resulting in both objects 508 and 510 being valid potential targets. In such a case, between the object 508 and object 510, object 510 may be positioned closer to (e.g., at a smaller angle from) the current facing of the origin object. In this example, the object 510 is selected as a target of the second action. The origin object is rotated toward the object 510 and the second action is performed.

Figure 6:
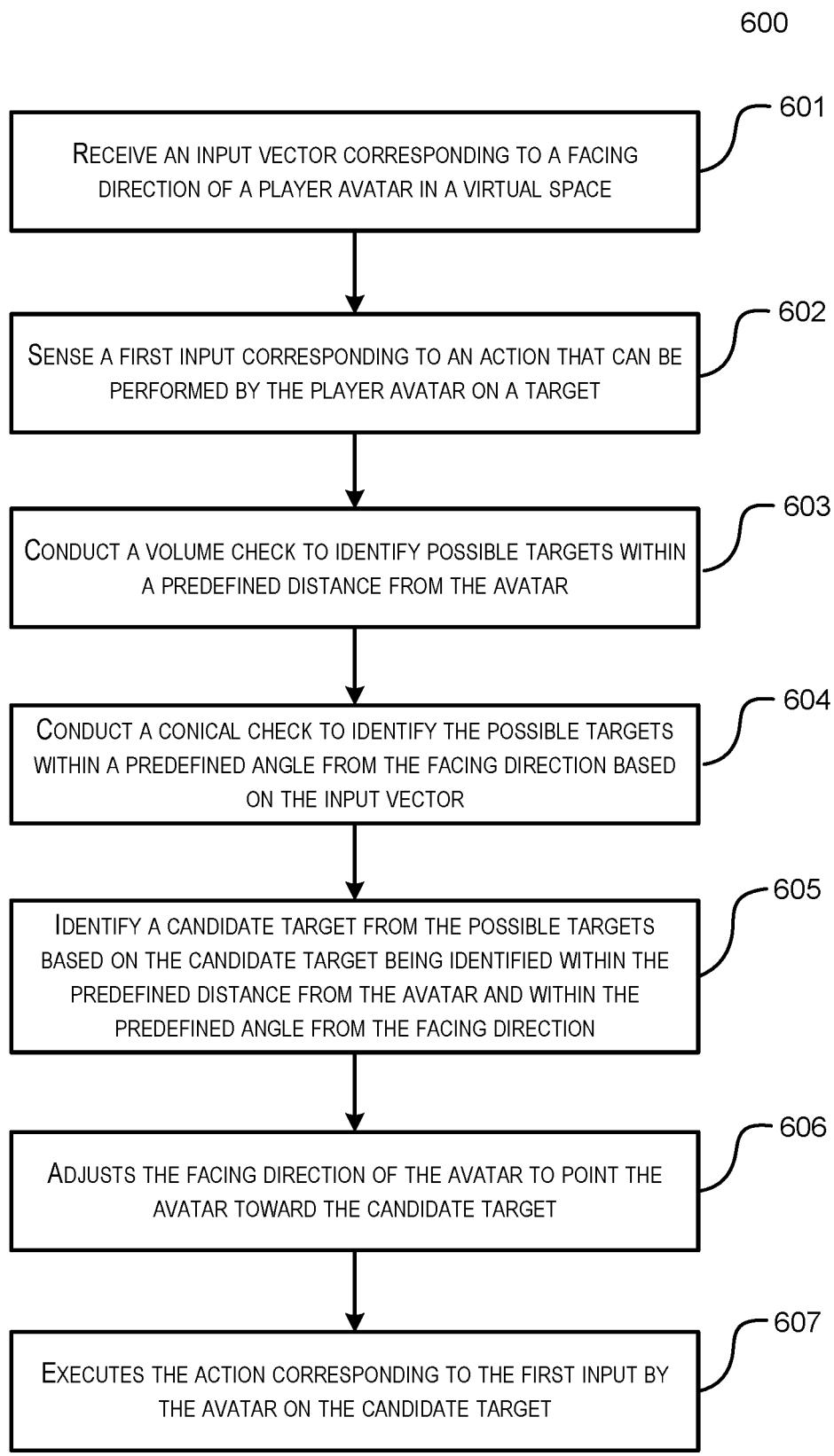
FIG. 6 depicts an example process flow for automatically targeting an object and executing an action on that action in accordance with embodiments.

FIG. 6 depicts an example process flow 600 for automatically targeting an object and executing an action on that action in accordance with embodiments. The process 600 can be performed on any suitable service environment, including but not limited to service environment 100 shown in FIG. 1. In accordance with various embodiments, process 600 includes receiving an input vector corresponding to a facing direction of a player avatar in a virtual space by the gaming system at 601. This facing direction can be the result of an ongoing control (e.g., movement input) or can be the result of previous inputs. The system can then sense a first input corresponding to an action that can be performed by the avatar on a target, e.g., an attack or instruction to collect an item, at 602. In response to sensing the first input, the system conducts a volume check to identify possible targets within a predefined distance from the avatar at 603, and conducts a conical check to identify the possible targets within a predefined angle from the facing direction based on the input vector at 604. The volume check and conical check can be conducted in series in either order, or can be conducted simultaneously. The system then identifies a candidate target from the possible targets based on the candidate target being identified within the predefined distance from the avatar and within the predefined angle from the facing direction at 605. Note that the system may identify multiple candidate targets, in which case, the system can prioritize targets in a variety of ways, e.g., by ordering targets based on distance from the avatar, by ordering targets to minimize the distance from the selected target and the facing direction vector, or a combination of the above. When the candidate target has been selected, the system adjusts the facing direction of the avatar to point the avatar toward the candidate target at 606, and executes the action corresponding to the first input by the avatar on the candidate target at 607.

Figure 7:
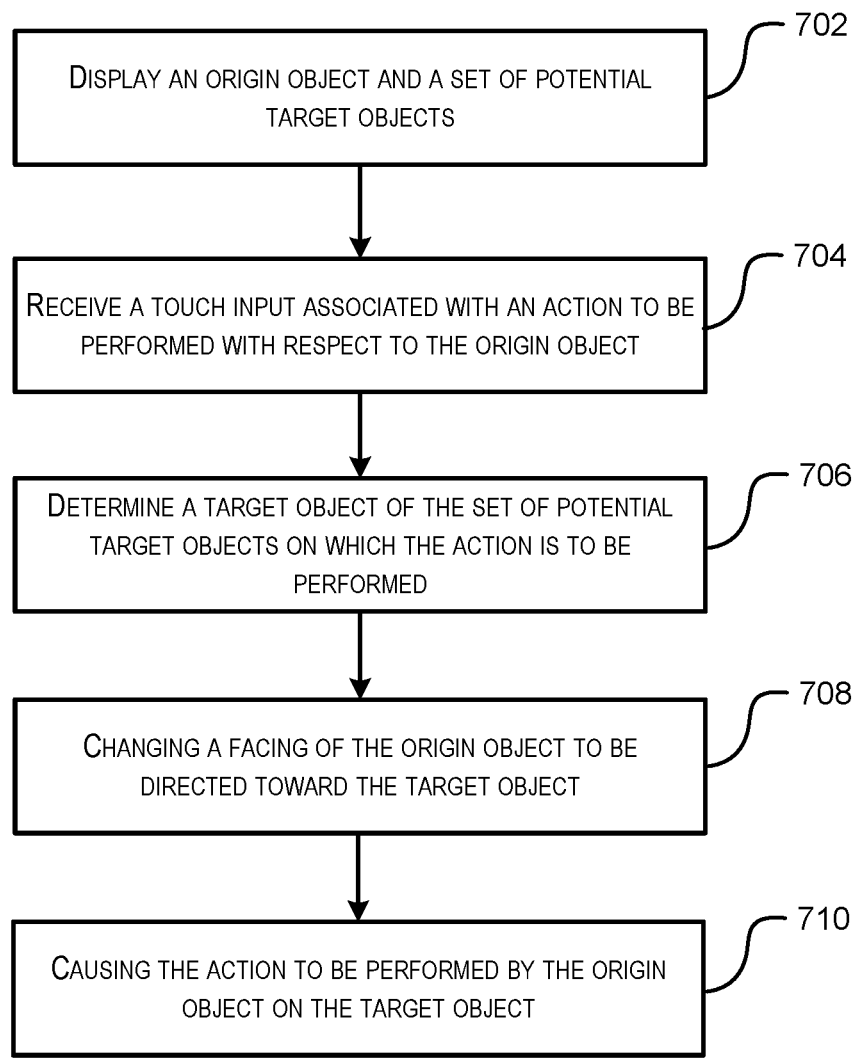
FIG. 7 depicts a flow diagram showing an example process flow for generating an implementing automatic object targeting on a virtualized physical controller in accordance with embodiments.

FIG. 7 depicts a flow diagram showing an example process flow 700 for generating an implementing automatic object targeting on a virtualized physical controller in accordance with embodiments. The process 700 may be performed by a computing device that is configured to generate activation data based on user input. For example, the process 700 may be performed by a controller capable of facilitating interaction between the user and a software application, such as the controller 302 described with respect to FIG. 3 above. In some embodiments, such a software application is a video game played by the user.

At 702, the process 700 comprises displaying an origin object and a set of potential target objects. In some embodiments, the origin object is an object (e.g., an avatar) in a video game that is being controlled by the user. In some embodiments, the set of potential target objects comprises target objects determined to be positioned within one or more areas associated with the action. In some cases, such areas may be conical in shape. In those embodiments, the one or more areas associated with the action may be determined based at least in part on a range of distance associated with the action.

At 704, the process 700 comprises receiving a touch input associated with an action to be performed by the origin object. In some embodiments, the origin object comprises an avatar controlled by a player via the user device. In some embodiments, the user establishes an At 706, the process 700 comprises determining a target object of the set of potential target objects on which the action is to be performed. In some embodiments, the target object is determined from the set of potential target objects based on preference data associated with a user. In some cases, the preference data associated with the user may include information about historic object targeting performed by the user. In some embodiments, the preference data associated with the user may include information about historic object targeting performed by the user. For example, the preference data associated with the user may include information provided by the user during a configuration phase.

At 708, the process 700 comprises changing a facing of the origin object to be at least partially directed toward the target object. In some embodiments, the facing of the origin object is established by the user prior to determining the target object of the set of potential objects, such as via a directional control pad implemented on the touchscreen display. In some cases, the target object of the set of potential objects is determined at least in part on the facing. For example, the target object may be determined based on an angular proximity of the target object from the facing of the origin object. In other words, the target object may be selected based on how close it is to a where the origin object is aimed.

In some embodiments, changing the facing of the origin object to be at least partially directed toward the target object involves rotating the origin object by an angular degree. In some embodiments, the origin object may be caused to rotate incrementally toward the target object, in that each time that a touch input is received, the origin object is rotated an angular degree toward facing the target object. In some embodiments, the angular degree of rotation may be constrained to a maximum rotation for the origin object. For example, where the target object is located at an angle of 45 degrees from the current facing of the origin object, and where a maximum rotation is 20 degrees, the origin object may be caused to rotate 20 degrees in the direction of the target object the first two times that the touch input is detected and to rotate 5 degrees in the direction of the target object the third time that the touch input is detected.

At 710, the process 700 comprises causing the action to be performed by the origin object on the target object. In some embodiments, the action is an interaction between the origin object and the target object. For example, in the case that the origin object is an avatar being controlled by the user, the origin object may be caused to pick up, attack, or otherwise interact with the target object. In some embodiments, the interaction may involve the origin object, once having been repositioned such that the facing of the origin object is directed toward the target object, moving toward that target object.

The methods described herein are directed to virtual controllers, i.e., controllers that use a touchscreen or touchscreen-like functionality to provide for readily customized controller button layouts. According to some embodiments, the touchscreen is at least a portion of a physical, handheld controller that interfaces with a gaming device like a gaming console, personal computer, tablet, smartphone, thin client device (e.g., USB or HDMI device plugged in to a screen). According to some embodiments, the touchscreen is the predominant feature of the controller, which interfaces with a gaming device like a gaming console, personal computer, tablet, smartphone, thin client device (e.g., USB or HDMI device plugged in to a screen). According to some embodiments, the controller is made up of a mobile device or tablet in conjunction with enabling software that connects the mobile device or tablet to a gaming device like a gaming console, personal computer, thin client device (e.g., USB or HDMI device plugged in to a screen) or other suitable gaming device. According to some further embodiments, the touchscreen is a touch-enabled screen of a gaming device like a gaming console, personal computer, tablet, or smartphone.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as being essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following, further examples are described to facilitate understanding of aspects of the invention:

A method comprising:
displaying, on a touchscreen display, an origin object and a set of potential target objects;
receiving, from a user via the touchscreen display, a touch input associated with an action to be performed by the origin object;
determining, based on the action, a target object of the set of potential target objects at which the action is to be performed;
changing a facing of the origin object based on a relative location of the target object with respect to the origin object; and
causing the action to be performed by the origin object.

The method of the preceding example, wherein determining the target object from the set of potential target objects comprises excluding a subset of the set of potential target objects determined to be outside one or more volumes associated with the action.

The method of any of the preceding examples, wherein the one or more volumes associated with the action are determined based at least in part on a range of distance associated with the action.

The method of any of the preceding examples, wherein the one or more volumes associated with the action are determined based at least in part on a conical section expanding from the origin object in a facing direction.

The method of any of the preceding examples, wherein changing the facing of the origin object comprises turning the origin object at least partway toward the target object.

The method of any of the preceding examples, wherein causing the action to be performed by the origin object comprises causing the origin object to move toward the target object.

The method of any of the preceding examples, wherein the target object is determined from the set of potential target objects based on preference data associated with a user.

The method of any of the preceding examples, wherein the preference data associated with the user comprises information about historic object targeting performed by the user.

The method of any of the preceding examples, wherein the preference data associated with the user comprises information provided by the user during a configuration phase.

A user device comprising:
a touchscreen display;
a processor; and
a memory including instructions that, when executed with the processor, cause the user device to, at least:
display, on the touchscreen display, an origin object and a set of potential target objects;
receive, from a user via the touchscreen display, a touch input associated with an action to be performed by the origin object;
determine, based on the action, a target object of the set of potential target objects at which the action is to be performed;
change a facing of the origin object based on a relative location of the target object with respect to the origin object; and
cause the action to be performed by the origin object.

The user device of the preceding example, wherein changing the facing of the origin object comprises incrementally adjusting the facing to align with the target object.

The user device of any of the preceding examples, wherein the target object of the set of potential objects is determined at least in part on the facing.

The user device of any of the preceding examples, wherein the target object is determined based on an angular proximity of the target object from the facing of the origin object.

The user device of any of the preceding examples, wherein the facing of the origin object is established via a directional control pad implemented on the touchscreen display.

The user device of any of the preceding examples, wherein the instructions comprise a virtual controller capable of facilitating interaction between the user and a software application.

The user device of any of the preceding examples, wherein changing the facing of the origin object based on the relative location of the target object with respect to the origin object comprises partly or fully rotating the origin object toward being directed at the target object.

The user device of any of the preceding examples, wherein the partly or fully rotating the origin object is constrained by a predefined maximum angle of rotation for the origin object.

A non-transitory computer-readable media collectively storing computer-executable instructions that upon execution cause one or more computing devices to collectively perform acts comprising:
displaying, on a touchscreen display, an origin object and a set of potential target objects;
receiving, from a user via the touchscreen display, a touch input associated with an action to be performed by the origin object;
determining, based on the action, a target object of the set of potential target objects at which the action is to be performed;
changing a facing of the origin object to be directed toward the target object; and
causing the action to be performed by the origin object on the target object.

The non-transitory computer-readable media of the preceding example, wherein the set of potential target objects comprises target objects determined to be positioned within one or more areas associated with the action.

The non-transitory computer-readable media of any of the preceding examples, wherein the one or more areas associated with the action are determined based at least in part on a range of distance associated with the action.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

The invention claimed is:

1. A method for virtual automatic aiming, the method comprising:
generating a display of one or more virtual controller input options to present on a touchscreen that includes a display of an origin object and a set of potential target objects;
receiving a touch input at a location on the touchscreen, wherein the virtual controller input option at the location is associated with an action to be performed by the origin object;
determining a target object from among the set of potential target objects based on the action and stored preference data that includes historic object targeting patterns;
changing a direction of a facing of the origin object based on a relative location of the determined target object with respect to the origin object; and
causing the action to be performed by the origin object toward the determined target object.

2. The method of claim 1, wherein determining the target object from among the set of potential target objects includes excluding a subset of the set of potential target objects determined to be outside one or more volumes associated with the action.

3. The method of claim 2, further comprising determining the one or more volumes associated with the action based at least in part on a range of distance associated with the action.

4. The method of claim 2, further comprising determining the one or more volumes associated with the action based at least in part on a conical section expanding from the origin object in the direction of the facing.

5. The method of claim 1, wherein changing the direction of the facing of the origin object includes rotating a direction of a front of the origin object to point toward the determined target object.

6. The method of claim 1, wherein the action includes moving toward the determined target object.

7. The method of claim 1, wherein the historic object targeting patterns further include data regarding one or more of a distance between the origin object and one or more of the potential target objects, an angle between the origin object and one or more of the potential target objects, and type of one or more of the potential target objects.

8. The method of claim 1, wherein the stored preference data includes information provided during a configuration phase.

9. The method of claim 1, further comprising generating ranking data based on the historic object targeting patterns, wherein determining the target object is further based on the ranking data.

10. A user device for virtual automatic aiming, the device comprising:
a touchscreen configured to display an origin object and a set of potential target objects; and
a processor that executes instructions stored in a memory to:
generate a display of one or more virtual controller input options to present on the touchscreen;
detect a touch input at a location on the touchscreen, wherein the virtual controller input option at the location is associated with an action to be performed by the origin object;
determine a target object from among the set of potential target objects based on the action and stored preference data that includes historic object targeting patterns;
change a direction of a facing of the origin object based on a relative location of the determined target object with respect to the origin object; and
cause the action to be performed by the origin object toward the determined target object.

11. The device of claim 10, wherein the processor determines the target object from among the set of potential target objects by excluding a subset of the set of potential target objects determined to be outside one or more volumes associated with the action.

12. The device of claim 11, wherein the processor executes further instructions to determine the one or more volumes associated with the action based at least in part on a range of distance associated with the action.

13. The device of claim 11, wherein the processor executes further instructions to determine the one or more volumes associated with the action based at least in part on a conical section expanding from the origin object in the direction of the facing.

14. The device of claim 10, wherein the processor changes the direction of the facing of the origin object by rotating a direction of a front of the origin object to point toward the determined target object.

15. The device of claim 10, wherein the action includes moving toward the determined target object.

16. The device of claim 10, wherein the historic object targeting patterns further include data regarding one or more of a distance between the origin object and one or more of the potential target objects, an angle between the origin object and one or more of the potential target objects, and type of one or more of the potential target objects.

17. The device of claim 10, wherein the stored preference data includes information provided during a configuration phase.

18. The device of claim 10, wherein the processor executes further instructions to generate ranking data based on the historic object targeting patterns, wherein determining the target object is further based on the ranking data.

19. A non-transitory, computer-readable storage medium, having embodied thereon a program executable by a processor to perform a method for virtual automatic aiming, the method comprising:
generating a display of one or more virtual controller input options to present on a touchscreen that includes a display of an origin object and a set of potential target objects;
receiving a touch input at a location on the touchscreen, wherein the virtual controller input option at the location is associated with an action to be performed by the origin object;
determining a target object from among the set of potential target objects based on the action and stored preference data that includes historic object targeting patterns;
changing a direction of a facing of the origin object based on a relative location of the determined target object with respect to the origin object; and
causing the action to be performed by the origin object toward the determined target object.

* * * * *